United States Patent [19]

Rodish

[11] 4,357,789
[45] Nov. 9, 1982

[54] SAFETY GRASS CUTTER FOR ROTARY LAWN MOWER

[75] Inventor: John Rodish, Ft. Wright, Ky.

[73] Assignee: Polynovus Industries, Inc., Ft. Wright, Ky.

[21] Appl. No.: 244,604

[22] Filed: Mar. 17, 1981

[51] Int. Cl.³ .......................................... A01D 55/18
[52] U.S. Cl. .................................................. 56/295
[58] Field of Search .......................................... 56/295

[56] References Cited

U.S. PATENT DOCUMENTS 3,014,333 12/1961 Clark, Jr. ................................ 56/295
3,283,488 11/1966 Franklin .................................. 56/295
3,805,502 4/1974 Herter ..................................... 56/295
4,147,018 4/1979 Valdespino ............................ 56/295

Primary Examiner—Jay N. Eskovitz
Attorney, Agent, or Firm—Hauke & Patalidis

[57] ABSTRACT

A rotary lawn mower cutter member in the form of a ring supporting a plurality of grass cutters each in the form of an helical torsion spring having a leg projecting beyond the periphery of the ring. The helical springs are mounted in holders removably attached to the ring such that, upon striking an obstacle, the spring projecting leg is yieldably deflected. The ring is connected to a hub by spokes and the hub is mounted on the end of the power output shaft of a rotary lawn mower.

15 Claims, 9 Drawing Figures

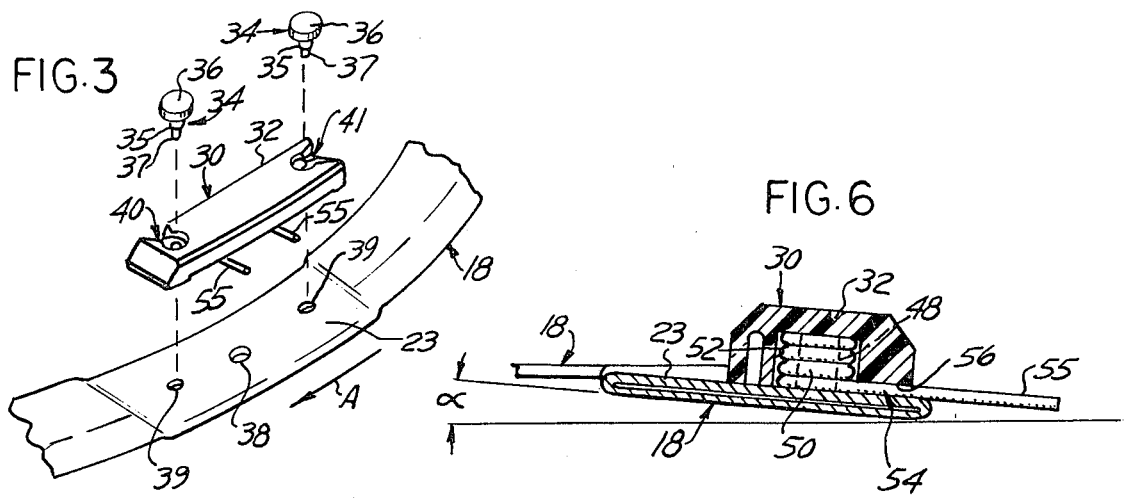
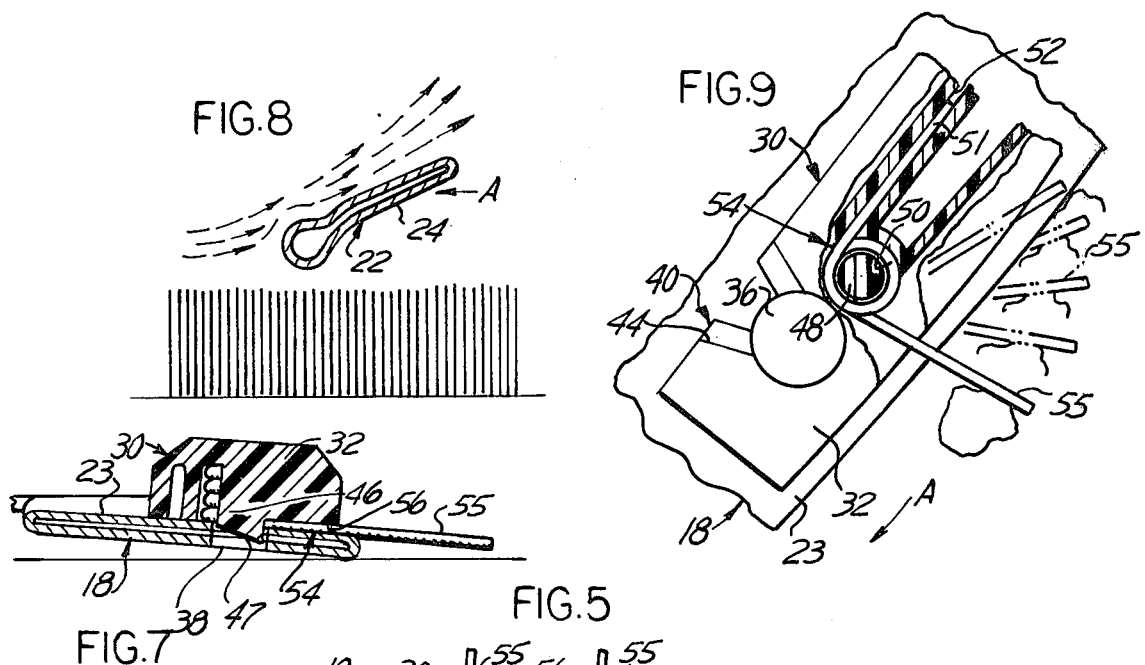
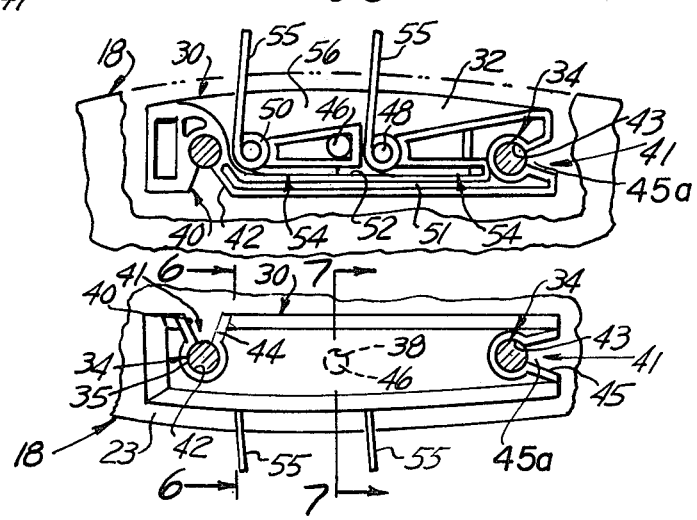

SAFETY GRASS CUTTER FOR ROTARY LAWN MOWER

BACKGROUND OF THE INVENTION

The present invention relates in general to rotary power lawn mowers, and more specifically to a safety rotary cutter for rotary type lawn mowers.

Conventional rotary lawn mowers are provided generally with a single steel blade sharpened at two opposite leading edges for cutting grass during rotation of the blade. The blade is also generally formed with a trailing edge twist to create air motion at a sufficient velocity to expell cut grass through a discharge chute in the shroud surrounding the blade.

Rotary mowers provided with steel blades have caused many injuries to users' fingers and feet through direct contact with the rotating blade, and other injuries and property damages by projection of stones, pebbles, or other objects hit by the rotating blade. Attempts have been made in the past to provide guards for the steel blade of a rotary mower, or to replace the steel blades with plastic cutters, whips and wires, but most of those attempts have met with limited success as a result of being either too complicated, too costly, or interfering to interfere with efficient grass cutting.

According to a report by the Consumers Products Safety Commission published in the Federal register, Feb. 15, 1979, Part V, there are approximately 77,000 persons injured each year by contacting the moving blades of walk-behind lawn mowers. As a result of the Commission's findings, new safety standards for lawn mowers have been adopted, effective Dec. 31, 1981. The most significant requirement under the new standards is that of a clutch-brake system capable of stopping the blade of a rotary power mower within three seconds. Such a requirement, even if it can be met, will considerably increase the price of lawn mowers.

SUMMARY OF THE INVENTION

The present invention provides a safety cutter for rotary type power lawn mowers particularly adapted to eliminate accidents involving amputations of fingers or toes, substantially reducing injuries involving lacerations, contusions or avulsions, and considerably decreasing the severity of these types of injuries. The present invention also considerably reduces the possibility of transforming objects lying in a lawn into high velocity projectiles which can cause considerable property damage and personal injury.

The present invention accomplishes its many objects and advantages by providing a cutter replacement unit for conventional rotary power lawn mowers which is mounted on the end of a mower power output shaft instead of the conventional steel blade. The invention provides a rotary cutter in the form of a ring supported by spoke-like members from a hub fastened to the end of the mower output shaft. The ring supports a plurality of cutting members in the form of a helical spring supported in appropriate removable replaceable holders, the spring having a leg normally projecting beyond the parameter of the ring. Upon engagement with an obstacle, the projecting leg is springingly deflected rearwardly relative to the direction of rotation of the ring, and the only portion of the parts in rotation capable of engaging an obstacle head-on is the relatively smooth rounded edge of the ring.

The various objects and advantages of the invention will become apparent to those skilled in the art when the following description of the best mode contemplated for practicing the invention is read in conjunction with the accompanying drawing wherein like reference numerals refer to like or equivalent parts and in which:

BRIEF DESCRIPTION OF THE DRAWINGS

FIG. 3 is a fragmentary exploded view, at an enlarged scale, of a portion of the structure of FIGS. 1 and 2;

FIG. 4 is a fragmentary top plan view, at an enlarged scale, of a portion of the structure of FIGS. 1 and 2;

FIG. 5 is a bottom plan view of the portion shown at FIG. 4, with some parts removed;

FIG. 6 is a sectional view along line 6—6 of FIG. 4;

FIG. 7 is a sectional view along line 7—7 of FIG. 4;

FIG. 8 is a schematic section, generally along line 8—8 of FIG. 2, with portions omitted for the sake of clarity, useful in explaining one of the advantages of the invention; and FIG. 9 is a schematic enlarged view of a portion of the structure of the invention, useful in explaining a further advantage of the present invention.

DETAILED DESCRIPTION OF THE PREFERRED EMBODIMENT

Figure 1:
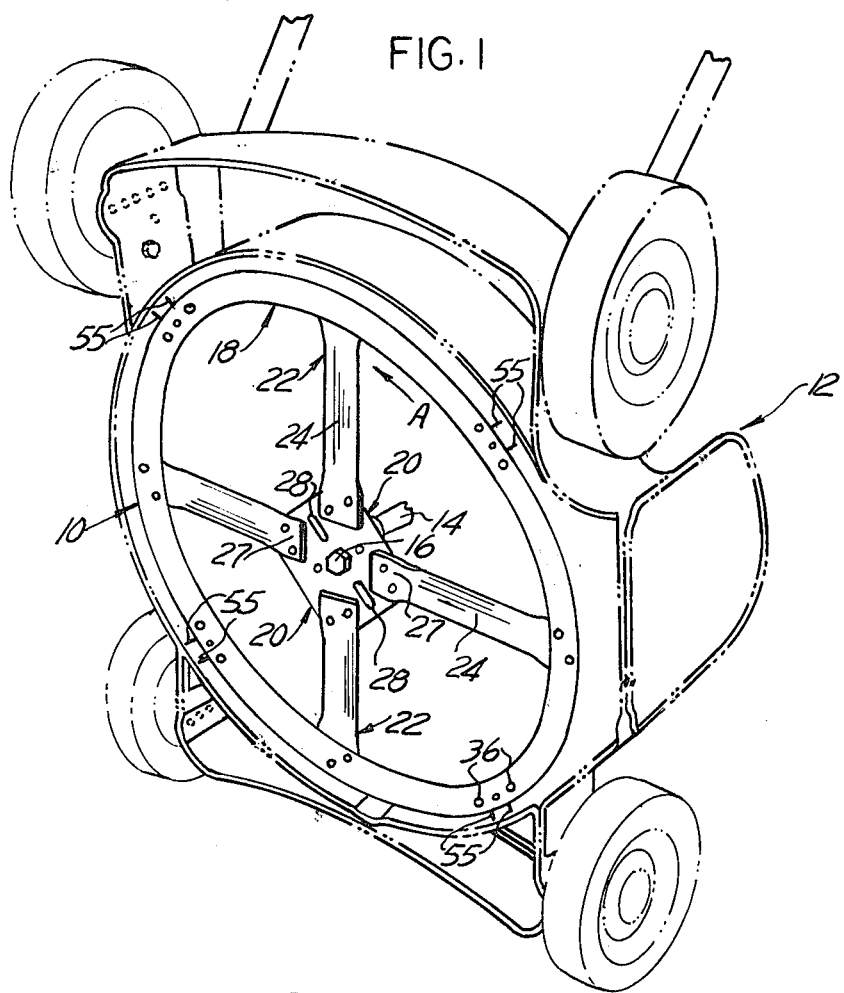
FIG. 1 is a perspective underside view of a rotary lawn mower equipped with a safety cutter device according to the present invention.

Referring now to the drawings and more particularly to FIG. 1, numeral 10 generally designates a lawn mower rotary safety cutter device according to the present invention which is shown installed on a typical walk-behind rotary power mower, designated at 12. The mower engine, not shown, drives the safety cutter device 10 through an output shaft 14 on the end of which the cutter device 10 is bolted, as shown at 16. The direction of rotation of the cutter device 10 is indicated by the arrows A in the drawings.

Figure 2:
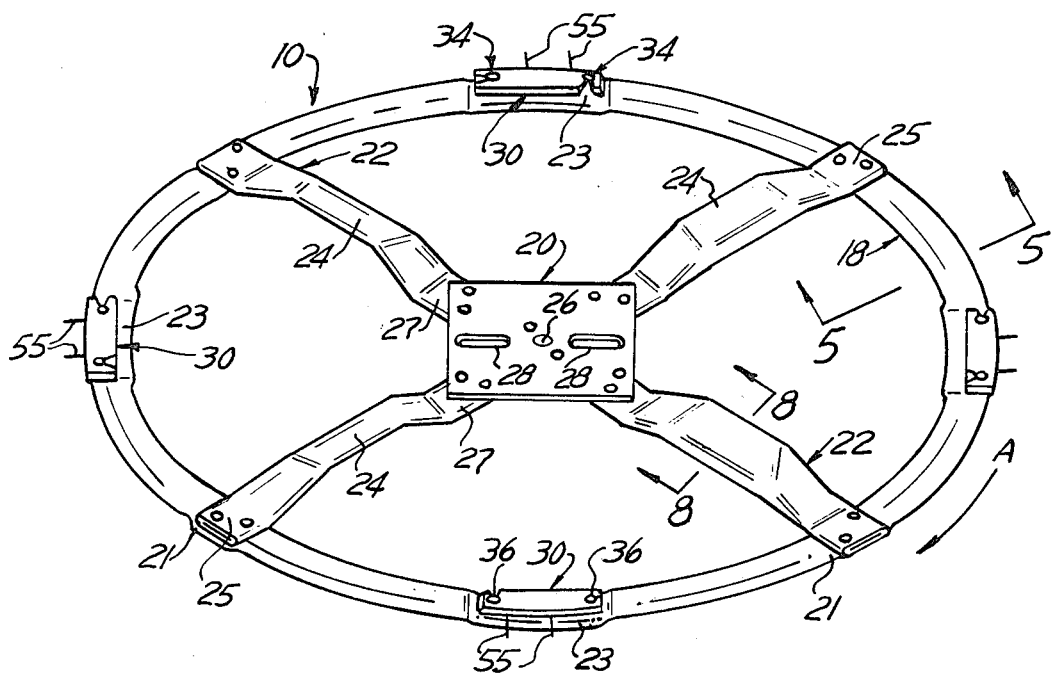
FIG. 2 is a top perspective view of the lawn mower rotary safety cutter device of the invention.

The rotary cutter device 10 comprises an annular ring 18, FIGS. 1 and 2, a hub 20 and four spokes 22 in the example of structure illustrated, the spokes 22 interconnecting and joining the ring 18 to the hub 20. The ring 18 is made of a length of flat tubular steel member bent in a loop with its ends butt-welded. The ring 18 is further flattened at eight locations, as shown, four of which define flat surfaces 21 for joining to the end of the spokes 22 and four of which form support surfaces 23 used for mounting four cutter blade assemblies 30.

The spokes 22 are also made of flat tubular steel members further flattened, at each end thereof, as shown at 25 and 27, respectively, for riveting to the ring 18 and to the hub 20, respectively. Each spoke 22 is formed with an upwardly bent portion 24, providing an airfoil disposed at a negative angle of attack which, during rotation of the cutter device 10, tends to lift the grass being cut, FIG. 8. The hub 20 is a square plate, in the example of structure shown, joined at its corners by rivets to the end portions 27 of the spokes 22. The hub 20 is provided with attaching means including a central mounting aperture 26, FIG. 2, and with slots 28, as shown, to accommodate various mounting arrangements of existing rotary mower output power shafts.

Each cutter assembly 30 comprises a plastic housing 32, FIGS. 3-5, molded of high density polyethylene for example, which is mounted on one of the flattened sections of the ring 18 forming a mounting surface 23. Each housing 32 is fastened to the ring 18 on its appropriate mounting surface 23 by a pair of shouldered rivets 34 each having a shank 35, a head 36 and a reduced diameter end portion 37 fitted in an aperture 39 through the ring 18, so as to upstand from the top of the mounting surface 23. A third aperture 38 is disposed between the apertures 39 on each mounting surface 23, also extending through the wall thickness of the flattened portion of the ring 18 defining the mounting surface 23. The co-operating mounting structure in each housing 32 includes a pair of open-ended slots 40 and 41 at opposite ends of the housing and a downwardly projecting peg 46 between the slots 40 and 41. The slot 40 opens to the inside edge of the housing 32 while the slot 41 opens to an end thereof which, during use of the safety cutter device 10, is the trailing edge of the housing 32. The slot 40 is provided with chamfered sides 44 converging toward a chamfered opening 42 gripping the shank 35 of the corresponding rivet 34. The slot 41 has comparable chamfered sides 45 converging toward a chamfered opening 43. The slots and corresponding openings are thus shaped like keyholes with a narrow gap therein, as shown at 45a, so that the housing 32 of the cutter assembly 30 snaps unto the respective pair of rivets 34 for fastening to the support surface 23 on the ring 18. The housing 32 is first snapped on the rivet 36 received in the opening 43 through the slot 41 and then pivoted therearound to snap on the rivet 36 received in the opening 42 through the slot 40. The peg 46 has an inclined end face 47 which is caused to enter the aperture 38 in the mounting surface 23 during pivoting of the housing 32, FIG. 7. The inclination of the peg end face 47 is oriented such that the edge of the peg inclined end face 47 projecting into the aperture 38 in the ring 18 opposes pivoting of the housing 32 in an opposite direction. The respective pair of rivets 34 and the peg 46 thus provide a three-point lock for the cutter assembly housing 32 to hold the latter on the mounting surface 23 on the ring 18. To replace any cutter assembly 30, the corresponding housing 32 is unlocked from the ring 18 by pushing up the peg 46 from below the mounting surface 23 through the aperture 38 to remove it from the aperture and by pivoting the housing 32 to unsnap it from the rivets 34 or alternatively, by prying the housing 32 in the direction that unsnaps it from the rivets, which results in shearing the projecting edge of the inclined end face 47 of the peg 46. The plastic material used for molding the housing 32 is resilient enough to allow the narrow gap 45a in the slots 40 and 41 to resiliently spread to afford passage to the rivet shank 35, and to enable the housing 32 to resiliently bend to allow the end of the peg 46 to snap into the aperture 38.

The underside of each housing 32 is formed with a pair of non-projecting pegs 48 and a slot 52 for holding a pair of helical torsion springs 54, and a recessed flat area 56. The coiled portion 50 of each spring 54 is disposed about a peg 48 while a leg 51 of each is held fast in the slot 52. The other leg of each spring, designated 55, which is oriented about 80°-90° from the leg 51, projects from the outside edge of the housing member 32 radially beyond the outer edge of the ring 18 to perform a grass cutting function. The cutter assembly support surfaces 23 on the ring 18 are formed so that the inside edge thereof is higher than the outside edge thereof to hold each cutter assembly 30 at an angle to the horizontal, of about 5° for example, with the result that the tip of each spring leg 55 points downwardly toward the grass to be cut, FIG. 6, the tip being disposed generally at the same level as the outer edge of the ring 18, as shown at FIG. 6. The recessed area 56 in the bottom of the cutter assembly housing 32 provides a clearance space between the housing and the mounting surface 23 which accommodates deflecting movements of the spring legs 55 toward the trailing edge of the housing 32 as a result of striking an obstruction during operation of the safety cutter device 10, as schematically illustrated at FIG. 9. Each spring cutter leg 55 is capable of retracting completely within the confines of the ring 18 upon contact with an obstruction, and of springingly returning to its extended cutting position after clearing the obstruction. As an example, the helical torsion spring may be made of spring steel wire 1 mm. in diameter whose projecting leg is about 19 mm. in length, 10 mm. of which normally projects beyond the edge of the ring 18.

It will thus be seen that there has been provided by the invention a lawn mower rotary safety cutter device in which the object hereinabove set forth, together with many other thoroughly practical advantages, has been successfully achieved. For example, the rotary safety cutter device 10 of the invention is light and saves energy by requiring less horsepower to operate than a conventional rotary mower blade and can be installed or replaced very quickly without special tools. The hub 20 adapts for mounting to most mower output shafts. The ring 18 has no projection that could throw objects, it provides a better balance for the output shaft, it is quieter in operation than conventional blades and it eliminates the need for expensive guards. The airfoil spokes 22 further contribute in providing better air flow for lifting the grass than conventional rotary mower blades, resulting in more efficient and neater grass cutting. The spoke airfoil effect is at least three times more effective than that of conventional mower straight bar blades. The airfoil construction and the angle of attack of the central portion of the spokes tend to force grass entering the ring 18 outwardly to the cutter spring legs 55 to be re-cut and broken up into mulch that is expelled through the discharge chute of the mower. The right cutting legs 55 are flexible, long lasting, are sharp enough for grass cutting but are not capable of severing fingers or toes. Trimming close to walls is easily effected and borders are not damaged. If the ring 18 strikes curbs or rocks, it is not damaged. Loose objects are not projected as dangerous missiles as is the case with conventional mower blades and, unlike the latter, the invention is incapable of inflicting anything but the most minor injury if any part of a foot or hand is inserted within the mower shroud.

While a preferred embodiment of the invention has been shown and described, it should be understood that variations and changes can be made without departing from the spirit of the invention as defined by the appended claims.

I claim:

1. A lawn mower rotary safety cutter device comprising an annular ring, a hub, at least a pair of spokes interconnecting and joining together the ring and the hub, and a plurality of spring steel cutter members projecting radially outwardly of the periphery of the ring for cutting grass during rotation of the ring, and means providing yieldable deflection of each grass cutter member up to within the perimeter of the ring upon striking an obstruction during rotation of the ring, wherein at least one of said cutter members is disposed in one of a plurality of cutter assembly mounting units mounted on said ring on mounting surfaces formed at regularly spaced apart locations, each of said cutter members is a helical spring having a coil portion and a pair of straight legs tangentially projecting from said coil portion, and each of said cutter assembly mounting units has an integral peg and the coil portion of said spring is mounted over said peg, one of said spring legs being retained in a slot in said cutter assembly mounting unit and the other of said spring legs forming said cutter member, said device further comprising interlocking means on said cutter assembly mounting unit and on a mounting surface on said ring for removably mounting each of said cutter assembly mounting units on one of said mounting surfaces.

2. The device of claim 1 wherein each of said spokes has a portion in the form of an airfoil disposed at a negative angle of attack for creating a suction effect for lifting the grass to be cut.

3. The device of claim 1 wherein said hub is in the form of a square plate having corners joined to the inner ends of said spokes.

4. The device of claim 1 wherein said mounting surface is at an angle relative to the horizontal such that a tip of said cutting member is disposed at about the same level as the edge of said ring.

5. The device of claim 1 wherein said interlocking means comprises a pair of rivets each disposed in an aperture in said mounting surface and each projecting above said mounting surface, a first slot in said cutter assembly mounting unit for engagement with one of said rivets, a second slot in said cutter assembly mounting unit directed such as to engage said second rivet upon pivoting said holding member around said first rivet, and a peg projecting below said holding member, said peg having an inclined surface for engaging said peg in a third aperture disposed in said mounting surface upon rotation of said cutter assembly mounting unit for engaging said second slot over said second rivet.

6. A lawn mower rotary safety cutter device comprising an annular ring, a hub, at least a pair of spokes interconnecting and joining together the ring and the hub, and a plurality of spring steel cutter members projecting radially outwardly from the periphery of the ring for cutting grass during rotation of the ring and means providing yieldable deflection of each of said cutter members up to within the perimeter of the ring upon striking an obstruction during rotation, wherein said cutter members are disposed within cutter assembly mounting units mounted on said ring at regularly spaced apart locations, wherein said rings and spokes are tubular and flattened at least where joined together, said ring being also flattened at said spaced apart locations for mounting said cutter assembly mounting units on the flattened mounting surfaces.

7. The device of claim 6 wherein each of said spokes has a portion in the form of an airfoil disposed at a negative angle of attack for creating a suction effect for lifting the grass to be cut.

8. The device of claim 7 wherein said hub is in the form of a square plate having corners joined to the inner ends of said spokes.

9. The device of claim 6 wherein each of said cutter members is a helical spring and each of said cutter assembly mounting units holds at least one of said springs with a leg of said spring forming said cutter member.

10. The device of claim 9 wherein said cutter assembly mounting unit has a peg and said helical spring has a coiled portion mounted over said peg, said cutter assembly mounting unit having a slot in which a leg of said spring is held fast.

11. The device of claim 10 further comprising interlocking means on said cutter assembly mounting unit and on the mounting surface of said ring for removably mounting said cutter assembly mounting unit on said mounting surface.

12. The device of claim 11 wherein said interlocking means comprises a pair of rivets each disposed in an aperture in said mounting surface and each projecting above said mounting surface, a first slot in said cutter assembly mounting unit for engagement with one of said rivets, a second slot in said cutter assembly mounting unit directed such as to engage said second rivet upon pivoting said holding member around said first rivet, and a peg projecting below said holding member, said peg having an inclined surface for engaging said peg in a third aperture disposed in said mounting surface upon rotation of said cutter assembly mounting unit for engaging said second slot over said second rivet.

13. The device of claim 12 wherein said mounting surface is at an angle relative to the horizontal such that a tip of said cutting member is disposed at about the same level as the edge of said ring.

14. A lawn mower rotary device comprising an annular ring, a hub, at least a pair of spokes interconnecting and joining together the ring and the hub, and a plurality of spring steel cutter members projecting radially outwardly from the periphery of the ring for cutting grass during rotation of the ring, and means providing yieldable deflection of each of said cutter members up to within the perimeter of the ring upon striking an obstruction during rotation, wherein said cutter members are disposed within cutter assembly mounting units mounted on said ring at regularly spaced apart locations, wherein interlocking means are provided on each of said cutter assembly mounting units and on a mounting surface on said ring for removably mounting at least one of said cutter assembly mounting units on said mounting surface, said interlocking means comprising a pair of rivets each disposed in an aperture in said mounting surface and each projecting above said mounting surface, a first slot in said cutter assembly mounting unit for engagement with one of said rivets, a second slot in said cutter assembly mounting unit directed such as to engage said second rivet upon pivoting said cutter assembly mounting unit around said first rivet, and a peg projecting below said cutter assembly housing unit, said peg having an inclined surface for engaging said peg in a third aperture disposed in said mounting surface upon rotation of said holding member for engaging said second slot over said second rivet.

15. The device of claim 14 wherein said mounting surface is at an angle relative to the horizontal such that a tip of said cutting member is disposed at about the same level as the edge of said ring.

* * * * *

UNITED STATES PATENT AND TRADEMARK OFFICE
CERTIFICATE OF CORRECTION

PATENT NO. : 4,357,789
DATED : November 9, 1982
INVENTOR(S) : John Rodish

It is certified that error appears in the above-identified patent and that said Letters Patent are hereby corrected as shown below:

Column 1, line 27, delete "to interfere".

Signed and Sealed this

Eleventh Day of January 1983

[SEAL]

Attest:

GERALD J MOSSINGHOFF

Attesting Officer   Commissioner of Patents and Trademarks